W. J. SHAFFER.
COTTON HARVESTER.
APPLICATION FILED MAY 22, 1913.
1,137,545.
Patented Apr. 27, 1915.
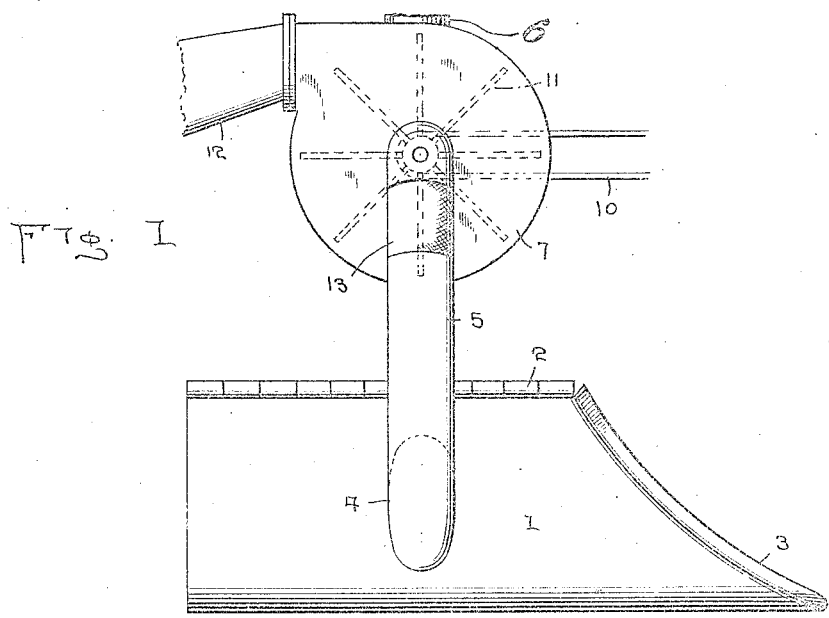
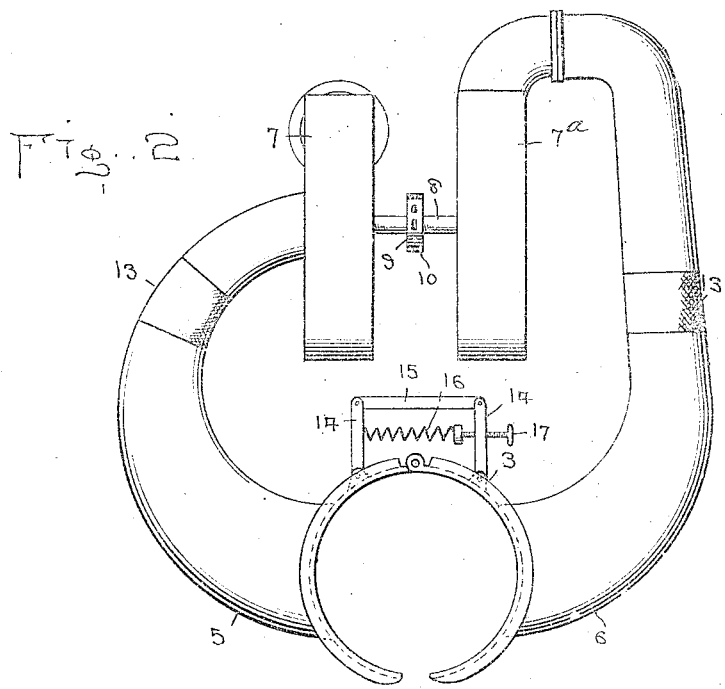
Witnesses
Inventor
W. J. Shaffer

UNITED STATES PATENT OFFICE.

WILLIAM J. SHAFFER, OF CHATTANOOGA, OKLAHOMA.

COTTON-HARVESTER.

1,137,545.  Specification of Letters Patent.  Patented Apr. 27, 1915.

Application filed May 22, 1913. Serial No. 769,262.

*To all whom it may concern:*

Be it known that I, WILLIAM J. SHAFFER, a citizen of the United States, residing at Chattanooga, in the county of Comanche and State of Oklahoma, have invented certain new and useful Improvements in Cotton-Harvesters; and I do hereby declare the following to be a full, clear, and exact description of the invention, such as will enable others skilled in the art to which it appertains to make and use the same.

This invention relates to cotton harvesters and particularly to a pneumatic harvester.

An object of the invention is to provide a hood adapted to be transported by a suitable vehicle in position for gathering together and enveloping plants preparatory to picking.

Another object is to provide means for discharging air into the hood through one side and further means for exhausting the air carrying the ripened cotton bolls through the opposite side.

In the accompanying drawing, Figure 1 represents a side elevation of the cotton harvester, unmounted, and, Fig. 2 represents a front view thereof.

Referring to the drawing wherein similar reference numerals designate corresponding parts throughout the several views, 1 indicates a hood formed in two parts substantially semicircular in cross section and hinged at 2 along the upper longitudinal edges thereof. Each of the forward ends of the sections of the hood 1 is curved downwardly and forwardly forming prow-shaped ends provided with the outwardly flared edges 3, the prow-shaped ends being provided for lifting and gathering plants that have lodged or fallen in the lateral direction of the rows. The sections forming the hood 1 may be suitably supported beneath a vehicle (not shown), which is adapted to carry suitable impelling means for the mechanism to be hereinafter described.

Arms 14 are pivoted to the parts of the hood 1 and are connected at the upper ends by a pivoted link 15. A spring 16 disposed between the arms 14 normally tends to draw the latter toward each other and consequently retains the hinged parts of the hood resiliently closed. However, when the hood parts are separated sufficiently to throw the pivot point thereof below a line between the pivot points of the arm 14, and hood parts the latter will be held apart by the spring 16.

By means of a hand screw 17 the spring 16 may be tensionally adjusted.

Openings 4 are formed substantially centrally of the hood 1 and are slightly elongated on a vertical line and connected with an exhaust tube 5 and a discharge tube 6. A pair of fans or blowers 7 and 7ª are suitably mounted upon the framework of the vehicle and is operated from the single shaft 8, by means of the sprocket wheel 9 adapted for connection with the sprocket chain 10, or by any other suitable transmission device connected with some suitable source of power (not shown). The exhaust tube 5 is connected at its upper end with the air intake port of the fan 7, and the discharge tube 6 is connected with the air outlet port of the fan 7ª, the discharge tube 6 being shown in full lines in Fig. 2, but in broken lines at the top of Fig. 1. Each of the fans or blowers is provided with any preferred form of blades 11, and the casing of the fan 7 is provided with a suitable outlet 12 through which is discharged the air containing the cotton bolls stripped from the plant.

It will be understood that the pipe 12 is adapted for connection with a suitable receiving receptacle provided with means for permitting the discharge of air but retaining the cotton therein. Suitable flexible connections 13 are intercepted between parts of the tubes 5 and 6 so as to permit the movement of the lower parts thereof which are rigidly connected with the parts of the hood 1.

In operation, the parts of the harvester herein described, which, as stated are adapted to be mounted upon a suitable vehicle to facilitate transportation thereof, is drawn over the field following the rows of cotton plants, and the hood 1 depending from the vehicle will straddle and embrace the plants as the harvester traverses the field, the prow end of the hood raising the plants that may have become lodged. As the plant is embraced and inclosed by the hood the suction produced therein with the assistance of the blast from the tube 6 will disengage the bolls of ripe cotton and they will pass upwardly through the suction tube 5 with the flow of air, into the fan casing 7, from which they are blown into a suitable receptacle (not shown), through the pipe 12.

What I claim is:—

1. In a machine of the class described, a suction apparatus, a blowing apparatus, a hood, a connection between the blowing apparatus and one side of the hood, and a connection between the suction apparatus and the opposite side of the hood.

2. In a machine of the class described, a suction apparatus, a blowing apparatus, a two part hood having the parts thereof hinged to each other, a hollow connection between the suction apparatus and one part of the hood, and a hollow connection between the blowing apparatus and the other part of the hood.

3. In a harvesting machine, a hood comprising two parts substantially semicircular in cross section and hinged along their upper longitudinal edges, the forward ends of said hood curved downwardly and forwardly forming prow-shaped ends to provide means for raising and gathering lodged plants.

4. In a harvesting machine, a hood comprising two parts substantially semicircular in cross section and hinged along their upper longitudinal edges, an arm pivotally secured to each of said parts, a pivoted link connecting the upper ends of said arms, a spring disposed between the arms for resiliently closing the parts of the hood, and means for adjusting the tension of the spring.

5. In a harvesting machine, a hood comprising two parts hinged together at their upper edges, pivoted members connecting said parts and resilient means controlling the pivoted members for closing the parts of said hood.

6. In a harvesting machine, a hood comprising two parts hinged together at their upper edges, resilient means for normally closing the parts of said hood, and means for adjusting the tension of said resilient means.

7. In a harvesting machine, a hood, means for creating a blast of air transversely through said hood, and means for creating a suction within said hood for coöperation with said air blast.

8. In a harvesting machine, a hood comprising two parts substantially semi-circular in cross section and hinged along their upper longitudinal edges, said parts having openings therein elongated on a vertical line, means at one side of said hood for creating a blast of air transversely through said hood, and means at the opposite side of said hood for creating suction therein.

In testimony whereof I have signed my name to this specification in the presence of two subscribing witnesses.

WILLIAM J. SHAFFER.

Witnesses:
 R. C. TATE,
 CLARA SANDERS.